United States Patent [19]
Azima et al.

[11] Patent Number: 6,151,402
[45] Date of Patent: Nov. 21, 2000

[54] VIBRATION TRANSDUCERS

[75] Inventors: Henry Azima, Chaucer Road; Martin Colloms, London; Neil John Harris, Cambridge, all of United Kingdom

[73] Assignee: New Transducers Limited, London, United Kingdom

[21] Appl. No.: 09/011,831

[22] PCT Filed: Sep. 2, 1996

[86] PCT No.: PCT/GB96/02148

§ 371 Date: May 13, 1998

§ 102(e) Date: May 13, 1998

[87] PCT Pub. No.: WO97/09858

PCT Pub. Date: Mar. 13, 1997

Related U.S. Application Data

[63] Continuation-in-part of application No. 08/707,012, Sep. 3, 1996.

[30] Foreign Application Priority Data

Sep. 2, 1995 [GB] United Kingdom .................... 9517918
Oct. 31, 1995 [GB] United Kingdom .................... 9522281
Mar. 30, 1996 [GB] United Kingdom .................... 9606836

[51] Int. Cl.[7] .................................................. H04R 25/00
[52] U.S. Cl. ........................... 381/396; 381/152; 181/142
[58] Field of Search ................................... 381/163, 359, 381/360, 373, 387, 396, 408, 431, 151, 152, 419; 181/142, 143

[56] References Cited

U.S. PATENT DOCUMENTS 1,778,084 10/1930 Nevin .
3,111,187 11/1963 Barlow .
3,430,007 2/1969 Thielen .
3,553,392 1/1971 Liebscher .
3,651,283 3/1972 Doschek .
3,728,497 4/1973 Komatsu .
4,392,027 7/1983 Bock .
4,720,868 1/1988 Hirano .
5,894,263 4/1999 Shimakawa et al. .

FOREIGN PATENT DOCUMENTS 2 023 375 12/1979 United Kingdom .
WO 92/03024 1/1992 WIPO .

*Primary Examiner*—Curtis A. Kuntz
*Assistant Examiner*—Phylesha Dabney
*Attorney, Agent, or Firm*—Foley & Lardner

[57] ABSTRACT

A vibration transducer adapted to be mounted on and launch bending waves into a member having opposed faces by applying a localized couple to the member. Also disclosed is a loudspeaker having such a transducer mounted on a member which acts as an acoustic resonator by sustaining resonant mode bending wave vibrations. The transducer comprises a motor coil assembly having a coil rigidly fixed to a tubular member, and a magnet assembly comprising opposed pole pieces, the periphery of one pole piece being disposed within and adjacent to the motor coil assembly, and the periphery of the other pole piece being disposed outside of and adjacent to the outside of the motor coil assembly. The magnet assembly has a central attachment portion adapted to be rigidly attached to the member to be vibrated. The motor coil assembly surrounds and is spaced from the central attachment portion of the magnet assembly, and has a surrounding attachment portion that is adapted to be rigidly fixed to one face of the member in spaced relation to the central attachment portion of the magnet assembly.

19 Claims, 4 Drawing Sheets

VIBRATION TRANSDUCERS

This application is a continuation-in-part of application Ser. No. 08/707,012, filed Sep. 3, 1996.

DESCRIPTION

1. Technical Field

The invention relates to transducers and more particularly to vibration transducers for loudspeakers comprising panel-form acoustic radiating elements.

2. Background Art

It is known from GB-A-2262861 to suggest a panel-form loudspeaker comprising:

- a resonant multi-mode radiator element being a unitary sandwich panel formed of two skins of material with a spacing core of transverse cellular construction, wherein the panel is such as to have ratio of bending stiffness (B), in all orientations, to the cube power of panel mass per unit surface area ($\mu$) of at least 10;
- a mounting means which supports the panel or attaches to it a supporting body, in a free undamped manner;
- and an electro-mechanical drive means coupled to the panel which serves to excite a multi-modal resonance in the radiator panel in response to an electrical input within a working frequency band for the loudspeaker.

U.S. Pat No. 4,506,117 of MULTIPHONIE discloses an electroacoustic transducer comprising an inertial mass adapted to be attached rigidly by its base plate to a panel to be vibrated.

DISCLOSURE OF INVENTION

Embodiments of the present invention use members of nature, structure and configuration achievable generally and/or specifically by implementing teachings of our co-pending parent application Ser. No. 08/707,012. Such members thus have capability to sustain and propagate input vibrational energy by bending waves in operative area(s) extending transversely of thickness often but not necessarily to edges of the member(s); are configured with or without anisotropy of bending stiffness to have resonant mode vibration components distributed over said area(s) beneficially for acoustic coupling with ambient air; and have predetermined preferential locations or sites within said area for transducer means, particularly operationally active or moving part(s) thereof effective in relation to acoustic vibrational activity in said area(s) and signals, usually electrical, corresponding to acoustic content of such vibrational activity. Uses are envisaged in co-pending, application Ser. No. 08/707,012 for such members as or in "passive" acoustic devices without transducer means, such as for reverberation or for acoustic filtering or for acoustically "voicing" a space or room; and as or in "active" acoustic devices with transducer means, such as in a remarkably wide range of sources of sound or loudspeakers when supplied with input signals to be converted to said sound, or in such as microphones when exposed to sound to be converted into other signals.

This invention is particularly concerned with active acoustic devices in the form of loudspeakers. Members as above are herein called distributed mode acoustic radiators and are intended to be characterised as in the above copending parent application and/or otherwise as specifically provided herein.

The invention is a vibration transducer for exciting a member having opposed faces and having capability to sustain and propagate input vibrational energy by bending waves in at least one operative area extending transversely of thickness comprising a motor coil assembly having a coil rigidly fixed to a tubular member, the motor coil assembly being adapted to be fixed to one face of the member at a surrounding attachment portion, and a magnet assembly having opposed pole pieces, the periphery of one of which pole pieces is arranged to be disposed within and adjacent to the motor coil assembly, and the periphery of the other of which pole pieces is disposed outside of adjacent to the motor coil assembly, and wherein the magnet assembly has a central attachment portion adapted to be rigidly attached to the said member to be vibrated, and the motor coil assembly surrounds and is spaced from the central attachment portion of the magnet assembly. A fastener may be provided for rigidly securing the magnet assembly to the member. The fastener is adapted to engage in a cavity in the member. The fastener may comprise a spacer for spacing the peripheries of the pole pieces from the said member. The vibration transducer may comprise complementary motor coil assemblies and magnet assemblies adapted for mounting on opposed faces of the said member, the fastener tying the centres of the magnet assemblies together for push/pull operation. Thus the fastener may have heads at opposite ends adapted to engage the respective magnet assemblies, the fastener comprising a pair of interengaging screw-threaded portions, and spacers adapted for disposition adjacent to the screw-threaded portions and adapted for sandwiching between the respective magnet assemblies and the opposed faces of the said member.

From another aspect the invention is a loudspeaker characterised by a member having capability to sustain and propagate input vibrational energy by bending waves in at least one operative area extending transversely of thickness to have resonant mode vibration components distributed over said at least one area and have predetermined preferential locations or sites within said area for transducer means and having a vibration transducer as described above mounted on said member at one of said locations or sites to vibrate the member to cause it to resonate forming an acoustic radiator which provides an acoustic output when resonating.

BRIEF DESCRIPTION OF DRAWINGS

The invention is diagrammatically illustrated, by way of example, in the accompanying drawings, in which.

BEST MODES FOR CARRYING OUT THE INVENTION

Figure 1:
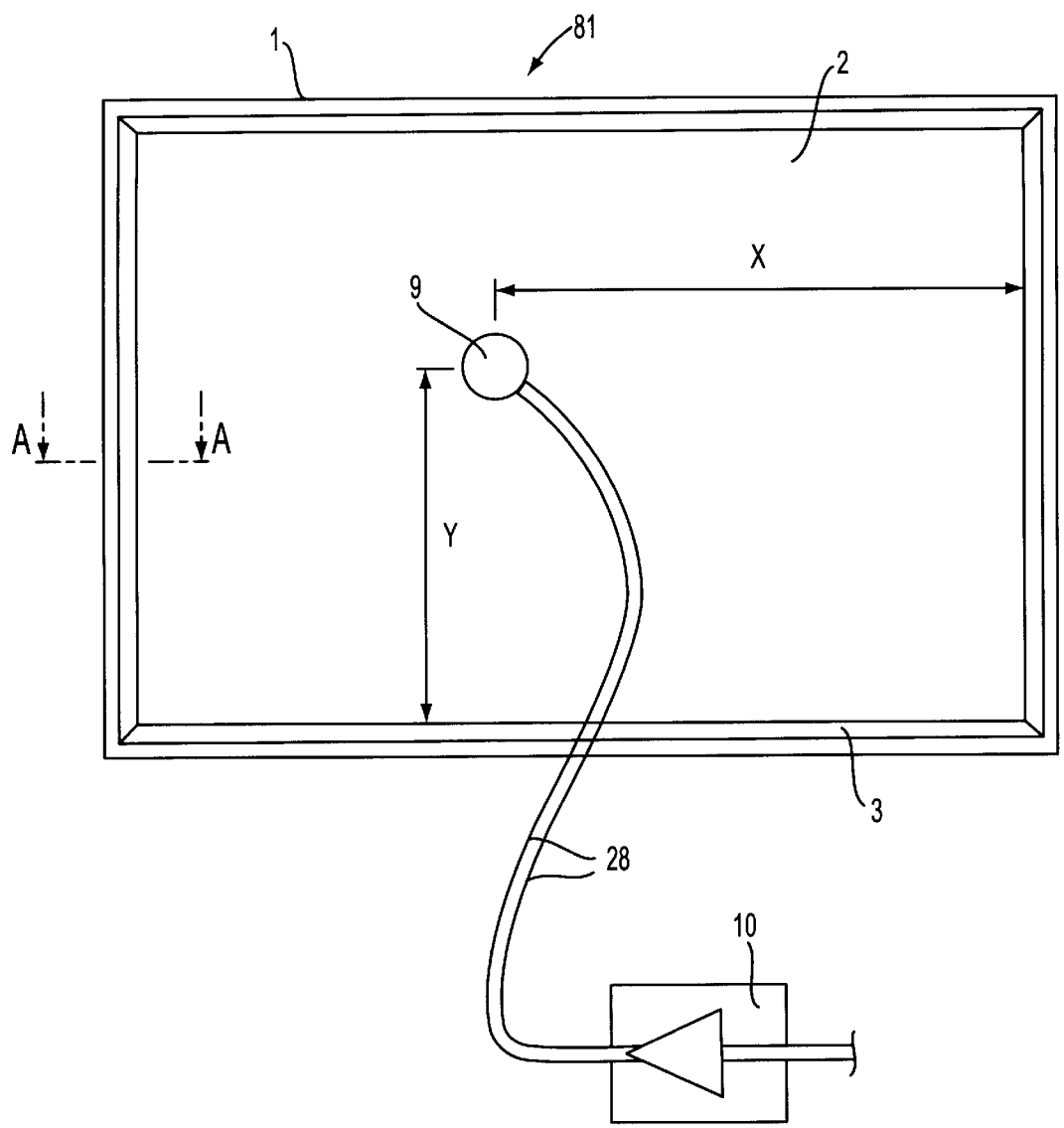
FIG. 1 is a diagram showing a distributed-mode loudspeaker as described and claimed in our co-pending parent application Ser. No. 08/707,012.

Referring to FIG. 1 of the drawings, there is shown a panel-form loudspeaker (81) of the kind described and claimed in our co-pending parent application Ser. No. 08/707,012 comprising a rectangular frame (1) carrying a resilient suspension (3) round its inner periphery which supports a distributed mode sound radiating panel (2). A transducer (9) e.g as described in detail with reference to our co-pending application Ser. Nos. 09/011,773, 09/011,770, and 09/011,831, is mounted wholly and exclusively on or in the panel (2) at a predetermined location defined by dimensions x and y, the position of which location is calculated as described in our co-pending parent application Ser. No. 08/707,012, to launch bending waves into the panel to cause the panel to resonate to radiate an acoustic output.

The transducer (9) is driven by a signal amplifier (10), e.g. an audio amplifier, connected to the transducer by conductors (28). Amplifier loading and power requirements can be entirely normal, similar to conventional cone type speakers, sensitivity being of the order of 86–88 dB/watt under room loaded conditions. Amplifier load impedance is largely resistive at 6 ohms, power handling 20–80 watts. Where the panel core and/or skins are of metal, they may be made to act as a heat sink for the transducer to remove heat from the motor coil of the transducer and thus improve power handling.

Figure 2A:
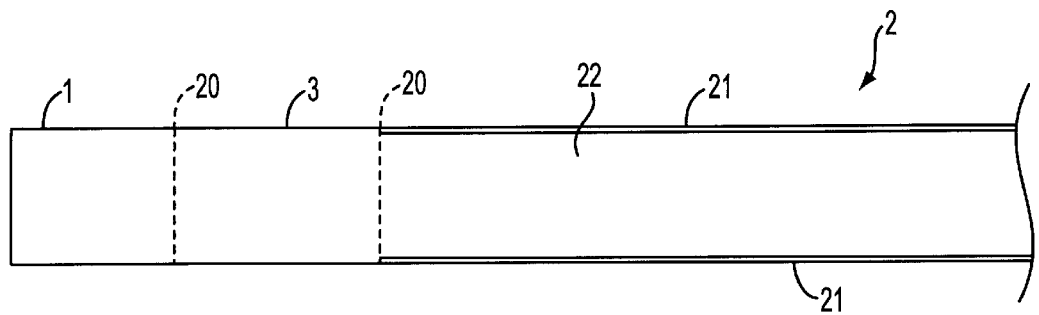
FIG. 2a is a partial section on the line A—A of FIG. 1.
Figure 2B:
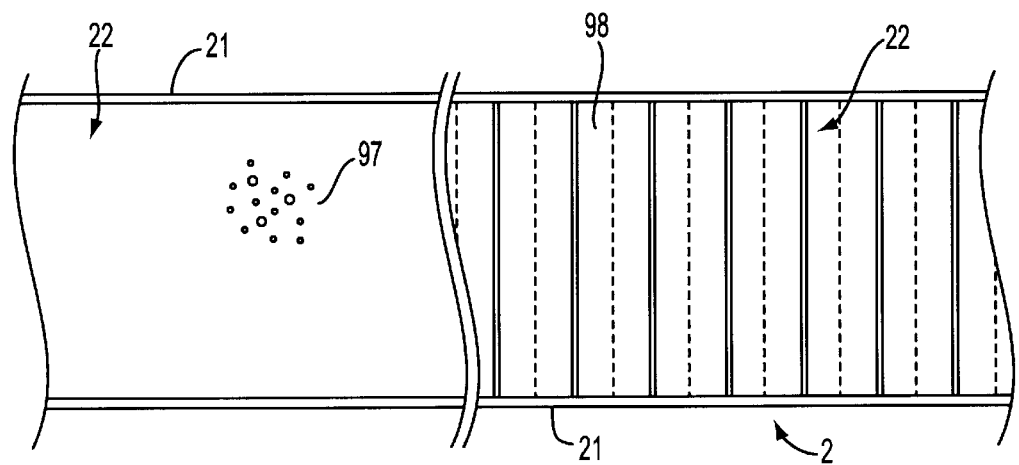
FIG. 2b is an enlarged cross-section through a distributed mode radiator of the kind shown in FIG. 2a and showing two alternative constructions.

FIGS. 2a and 2b are partial typical cross-sections through the loudspeaker (81) of FIG. 1. FIG. 2a shows that the frame (1), surround (3) and panel (2) are connected together by respective adhesive-bonded joints (20). Suitable materials for the frame include lightweight framing, e.g. picture framing of extruded metal e.g. aluminium alloy or plastics. Suitable surround materials include resilient materials such as foam rubber and foam plastics. Suitable adhesives for the joints (20) include epoxy, acrylic and cyano-acrylate etc. adhesives.

FIG. 2b illustrates, to an enlarged scale, that the panel (2) is a rigid lightweight panel having a core (22) e.g. of a rigid plastics foam (97) e.g. cross linked polyvinylchloride or a cellular matrix (98) i.e. a honeycomb matrix of metal foil, plastics or the like, with the cells extending transversely to the plane of the panel, and enclosed by opposed skins (21) e.g. of paper, card, plastics or metal foil or sheet. Where the skins are of plastics, they may be reinforced with fibres e.g. of carbon, glass, Kevlar (RTM) or the like in a manner known per se to increase their modulus.

Envisaged skin layer materials and reinforcements thus include carbon, glass, Kevlar (RTM), Nomex (RTM) i.e. aramid etc. fibres in various lays and weaves, as well as paper, bonded paper laminates, melamine, and various synthetic plastics films of high modulus, such as Mylar (RTM), Kaptan (RTM), polycarbonate, phenolic, polyester or related plastics, and fibre reinforced plastics, etc. and metal sheet or foil. Investigation of the Vectra grade of liquid crystal polymer thermoplastics shows that they may be useful for the injection moulding of ultra thin skins or shells of smaller size, say up to around 30 cm diameter. This material self forms an orientated crystal structure in the direction of injection, a preferred orientation for the good propagation of treble energy from the driving point to the panel perimeter.

Additional such moulding for this and other thermoplastics allows for the mould tooling to carry location and registration features such as grooves or rings for the accurate location of transducer parts e.g. the motor coil, and the magnet suspension. Additionally with some weaker core materials it is calculated that it would be advantageous to increase the skin thickness locally e.g. in an area or annulus up to 150% of the transducer diameter, to reinforce that area and beneficially couple vibration energy into the panel. High frequency response will be improved with the softer foam materials by this means.

Envisaged core layer materials include fabricated honeycombs or corrugations of aluminium alloy sheet or foil, or Kevlar (RTM), Nomex (RTM), plain or bonded papers, and various synthetic plastics films, as well as expanded or foamed plastics or pulp materials, even aerogel metals if of suitably low density. Some suitable core layer materials effectively exhibit usable self-skinning in their manufacture and/or otherwise have enough inherent stiffness for use without lamination between skin layers. A high performance cellular core material is known under the trade name 'Rohacell' which may be suitable as a radiator panel and which is without skins. In practical terms, the aim is for an overall lightness and stiffness suited to a particular purpose, specifically including optimising contributions from core and skin layers and transitions between them.

Several of the preferred formulations for the panel employ metal and metal alloy skins, or alternatively a carbon fibre reinforcement. Both of these, and also designs with an alloy Aerogel or metal honeycomb core, will have substantial radio frequency screening properties which should be important in several EMC applications. Conventional panel or cone type speakers have no inherent EMC screening capability.

In addition the preferred form of piezo and electro dynamic transducers have negligible electromagnetic radiation or stray magnetic fields. Conventional speakers have a large magnetic field, up to 1 meter distant unless specific compensation counter measures are taken.

Where it is important to maintain the screening in an application, electrical connection can be made to the conductive parts of an appropriate distributed mode acoustic radiator panel or an electrically conductive foam or similar interface may be used for the edge mounting.

The suspension (3) may damp the edges of the panel (2) to prevent excessive edge movement of the panel. Additionally or alternatively, further damping may be applied, e.g. as patches, bonded to the panel in selected positions to damp excessive movement to distribute resonance equally over the panel. The patches may be of bitumen-based material, as commonly used in conventional loudspeaker enclosures or may be of a resilient or rigid polymeric sheet material. Some materials, notably paper and card, and some cores may be self-damping. Where desired, the damping may be increased in the construction of the panels by employing resiliently setting, rather than rigid setting adhesives.

Effective said selective damping includes specific application to the panel including its sheet material of means permanently associated therewith. Edges and corners can be particularly significant for dominant and less dispersed low frequency vibration modes of panels hereof. Edge-wise fixing of damping means can usefully lead to a panel with its said sheet material fully framed, though their corners can often be relatively free, say for desired extension to lower frequency operation. Attachment can be by adhesive or self-adhesive materials. Other forms of useful damping, particularly in terms of more subtle effects and/or mid- and higher frequencies can be by way of suitable mass or masses affixed to the sheet material at predetermined effective medial localised positions of said area.

An acoustic panel as described above is bi-directional. The sound energy from the back is not strongly phase related to that from the front. Consequently there is the benefit of overall summation of acoustic power in the room, sound energy of uniform frequency distribution, reduced reflective and standing wave effects and with the advantage of superior reproduction of the natural space and ambience in the reproduced sound recordings.

While the radiation from the acoustic panel is largely non-directional, the percentage of phase related information increases off axis. For improved focus for the phantom stereo image, placement of the speakers, like pictures, at the usual standing person height, confers the benefit of a moderate off-axis placement for the normally seated listener optimising the stereo effect. Likewise the triangular left/ right geometry with respect to the listener provides a further angular component. Good stereo is thus obtainable.

There is a further advantage for a group of listeners compared with conventional speaker reproduction. The intrinsically dispersed nature of acoustic panel sound radiation gives it a sound volume which does not obey the inverse square law for distance for an equivalent point source. Because the intensity fall-off with distance is much less than predicted by inverse square law then consequently for off-centre and poorly placed listeners the intensity field for the panel speaker promotes a superior stereo effect compared to conventional speakers. This is because the off-centre placed listener does not suffer the doubled problem due to proximity to the nearer speaker; firstly the excessive increase in loudness from the nearer speaker, and then the corresponding decrease in loudness from the further loudspeaker.

There is also the advantage of a flat, lightweight panel-form speaker, visually attractive, of good sound quality and requiring only one transducer and no crossover for a full range sound from each panel diaphragm.

Figure 3:
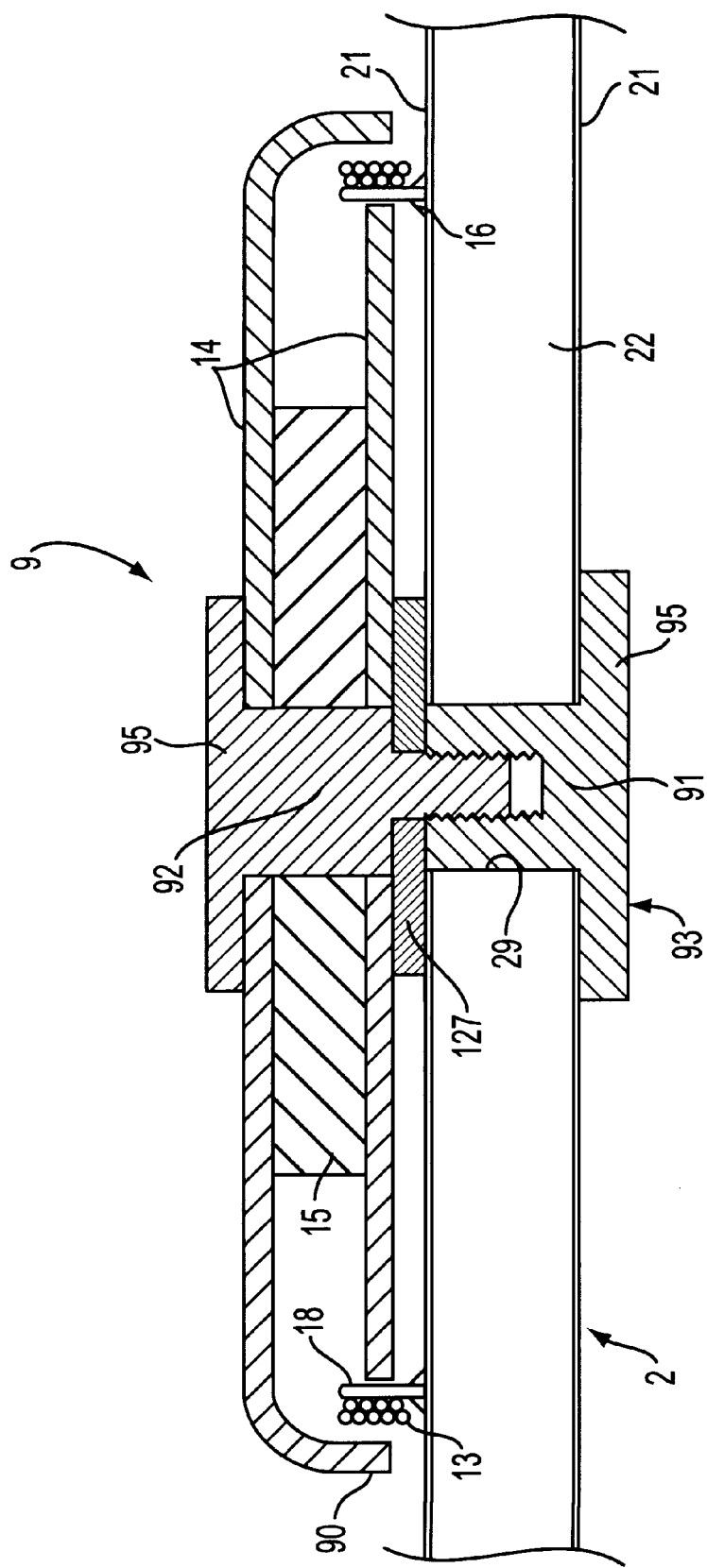
FIG. 3 is a diagram of a first embodiment of transducer according to the present invention.

FIG. 3 illustrates an embodiment of transducer (9) for launching bending waves into a rigid lightweight distributed mode radiator panel (2), e.g. of the kind shown in FIGS. 1 and 2 comprising a core (22) enclosed by opposed skins (21), to cause the panel to resonate.

The transducer comprises a coil (13) rigidly fixed, e.g. by means of an adhesive, on the outside of a coil former (18) which is rigidly bonded to a surface skin (21) of the radiator panel (2), e.g. by means of an epoxy adhesive bond (16). A magnet (15) is enclosed by a pair of poles (14), one of which is disc-like and is disposed with its periphery close to the interior of the coil former (18), and the other of which has a peripheral flange (90) arranged to surround the coil (13).

The magnet assembly including the magnet (15) and poles (14) is mounted on the panel (2) by means of a fastener (93), e.g. of metal or hard plastics, which passes through a cavity (29) extending through the panel (2). The fastener (93) comprises a complementary pair of threaded members (91, 92) each having heads (95), one of which heads bears against an outer face of the transducer (9) and the other of which heads bear against a face of the panel (2) on the side of the panel opposite to that on which the transducer is mounted. A spacer (127) is trapped between the transducer (9) and the panel (2) to space the transducer from the panel.

The transducer (9) of FIG. 3 operates by locally resiliently bending the panel between the fastener (93) and the former (18) when an acoustic signal is applied to the transducer to launch bending waves into the panel to cause it to resonate.

Figure 4:
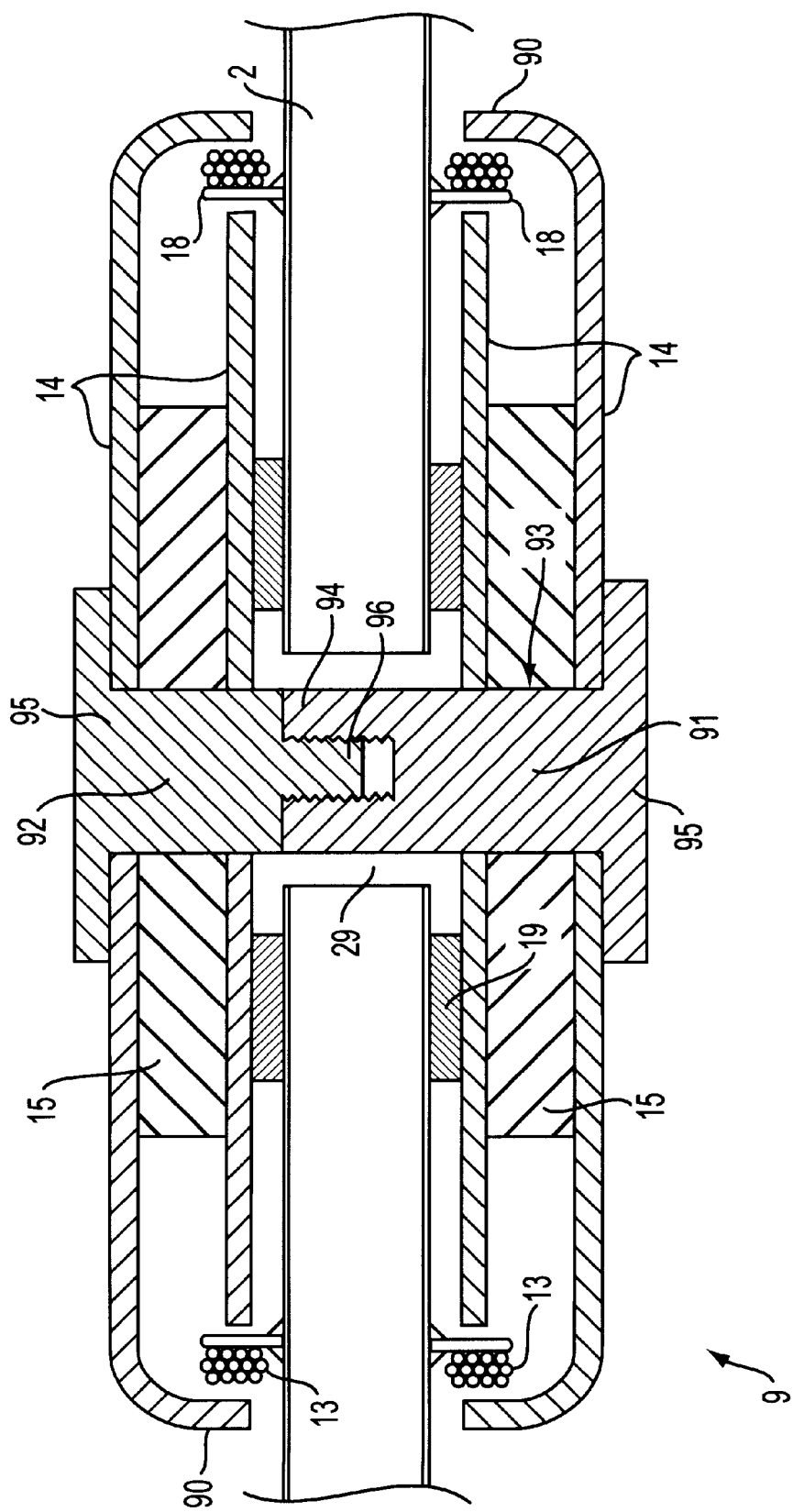
FIG. 4 is a diagram a second embodiment of transducer according to the present invention.

The transducer arrangement (9) of FIG. 4 is similar to that described in FIG. 3, except that in this embodiment the transducer comprises complementary push/pull drivers of the kind shown in FIG. 3 disposed on opposite sides of the panel. A fastener (93) is arranged to pass through an aperture (29) in the panel (2) to tie the two drivers together and to the panel. The fastener (93) comprises opposed generally complementary parts each formed with a head (95) which are clamped against the axial extremities of the respective pair of drivers (9) to couple the drivers together. The complementary parts of the fastener (93) are secured together by complementary screw-threaded portions (94, 96). The fastener may be of any suitable material e.g. plastics or metal.

In this embodiment the transducer device (9) is rigidly clamped to the panel (2) by means of rigid spacer pads (19), e.g. of hard plastics, positioned between the panel and the poles (14) adjacent to the aperture (29), whereby the transducer works to launch bending waves into the panel by local resilient bending of the panel between the pads and the coil former (18).

What is claimed is:

1. A vibration transducer (9) adapted to be mounted on and excite a member (2) having opposed faces and a capability to sustain and propagate input vibrational energy by bending waves in at least one operative area extending transversely of thickness, the vibration transducer comprising:

a motor coil assembly (13, 18) having a coil (13) rigidly fixed to a tubular member (18), and a magnet assembly (15), having opposed pole pieces (14), the periphery of one of said pole pieces being disposed within and adjacent to the motor coil assembly, and the periphery of the other of said pole pieces being disposed outside of and adjacent to the motor coil assembly, wherein the magnet assembly has a central attachment portion adapted to be rigidly attached to said member (2) to be vibrated, wherein the motor coil assembly surrounds and is spaced from said central attachment portion of the magnet assembly and has a surrounding attachment portion adapted to be rigidly attached to one face of the member in spaced relation to said central attachment portion of the magnet assembly, and wherein the motor coil assembly and the magnet assembly move in opposite directions when a signal current is applied to the motor coil assembly, whereby the motor coil assembly and the magnet assembly apply a couple to the member when attached thereto through their respective spaced attachment portions to launch bending waves into the member.

2. A vibration transducer according to claim 1, further comprising a fastener for rigidly securing the magnet assembly (15) at its centre to the member (2).

3. A vibration transducer according to claim 2, wherein the fastener (91, 92) is adapted to engage in a cavity (29) in the member (2).

4. A vibration transducer according to claim 3, wherein the fastener (91, 92) comprises a spacer (127) for spacing the peripheries of the pole pieces (14) from the said member (2).

5. A vibration transducer according to claim 2 comprising complementary motor coil assemblies (13, 18) and magnet assemblies (15) adapted for mounting on opposed faces of the said member (2), said fastener (93) tying the centres of the magnet assemblies (15) together for push/pull operation.

6. A vibration transducer according to claim 5, wherein the fastener (91, 92) has heads (95) at opposite ends adapted to engage the respective magnet assemblies, a pair of interengaging screw-threaded portions (94, 96), and spacers (19) adapted for disposition adjacent to the screw-threaded portions and adapted for sandwiching between the respective magnet assemblies and the opposed faces of the said member (2).

7. A vibration transducer according to claim 1, wherein said magnet assembly comprises at least one magnet interposed between said pole pieces, and the motor coil assembly surrounds said at least one magnet.

8. A vibration transducer according to claim 7, wherein said tubular member has two open ends, said surrounding attachment portion of the motor coil assembly comprises one end of said tubular member, said other of said pole pieces comprises a disclike portion extending across and spaced from the other end of said tubular member, and the periphery of said other of said pole pieces comprises a surrounding flange extending from said disclike portion and surrounding the motor coil assembly.

9. A vibration transducer according to claim 1, wherein said tubular member has two open ends, and said surrounding attachment portion of the motor coil assembly comprises one end of said tubular member.

10. A loudspeaker comprising:
- a member having opposed faces and a capability to sustain and propagate input vibrational energy by bending waves in at least one operative area extending transversely of thickness to have resonant mode vibration components distributed over said at least one area and have predetermined preferential locations or sites within said area for a transducer for exciting the member, and
- a transducer mounted on said member at one of said locations or sites for vibrating member to cause it to resonate forming an acoustic radiator which provides an acoustic output when resonating, the transducer comprising:
  - a motor coil assembly having a coil rigidly fixed to a tubular member, and
  - a magnet assembly, having opposed pole pieces, the periphery of one of said pole pieces being disposed within and adjacent to the motor coil assembly, and the periphery of the other of said pole pieces being disposed outside of and adjacent to the motor coil assembly,
  - wherein the magnet assembly has a central attachment portion rigidly attached to the member to be vibrated,
  - wherein the motor coil assembly surrounds and is spaced from said central attachment portion of the magnet assembly and has a surrounding attachment portion rigidly attached to one face of the member in spaced relation to said central attachment portion of the magnet assembly, and
  - wherein the motor coil assembly and the magnet assembly move in opposite directions when a signal current is applied to the motor coil assembly, whereby the motor coil assembly and the magnet assembly apply a couple to the member through their respective spaced attachment portions to launch bending waves into the member.

11. A loudspeaker according to claim 10, wherein said transducer further comprises a fastener which rigidly secures the magnet assembly at its centre to the member.

12. A loudspeaker according to claim 11, wherein the fastener engages in a cavity in the member.

13. A loudspeaker according to claim 12, wherein the fastener comprises a spacer which spaces the peripheries of the pole pieces from the said member.

14. A loudspeaker according to claim 10, comprising complementary motor coil assemblies and magnet assemblies mounted on opposed faces of the said member, said fastener tying the centres of the magnet assemblies together for push/pull operation.

15. A loudspeaker according to claim 14, wherein the fastener has heads at opposite ends which engage the respective magnet assemblies, a pair of interengaging screw-threaded portions, and spacers disposed adjacent to the screw-threaded portions and sandwiched between the respective magnet assemblies and the opposed faces of the said member.

16. A loudspeaker according to claim 10, wherein said magnet assembly comprises at least one magnet interposed between said pole pieces, and the motor coil assembly surrounds said at least one magnet.

17. A loudspeaker according to claim 16, wherein said tubular member has two open ends, said surrounding attachment portion of the motor coil assembly comprises one end of said tubular member, said other of said pole pieces comprises a disclike portion extending across and spaced from the other end of said tubular member, and the periphery of said other of said pole pieces comprises a surrounding flange extending from said disclike portion and surrounding the motor coil assembly.

18. A loudspeaker according to claim 10, wherein said tubular member has two open ends, and said surrounding attachment portion of the motor coil assembly comprises one end of said tubular member.

19. A loudspeaker according to claim 18, wherein said one end of said tubular member is rigidly attached to one face of the member by adhesive.

* * * * *